Feb. 2, 1965 T. L. BLISS 3,168,057
HAY PELLETIZING MACHINE
Filed April 14, 1961 3 Sheets-Sheet 1

INVENTOR.
THERON L. BLISS.
BY John J. McLaughlin
ATTORNEY.

INVENTOR.
THERON L. BLISS.
BY
John J. McLaughlin
ATTORNEY.

INVENTOR.
THERON L. BLISS.
BY
John J. McLaughlin
ATTORNEY.

United States Patent Office 3,168,057
Patented Feb. 2, 1965

3,168,057
HAY PELLETIZING MACHINE
Theron L. Bliss, P.O. Box 345A, Rte. 1, Buckeye, Ariz.
Filed Apr. 14, 1961, Ser. No. 103,086
15 Claims. (Cl. 107—14)

My invention relates to means for pelletizing hay.

For a relatively large number of years there have been attempts, sometimes partially successful, to pelletize bulk animal feeds of the type commonly referred to as "hay," but including also various alfalfa, fodders and haylike products capable of being compacted and formed into relatively bite-size pellets for easy storage, handling and animal consumption. In general the methods of and means heretofore employed for pelletizing such hay products have not been fully satisfactory, principally because the pelletizing process has been relatively too expensive; has been ineffective, or has not been uniformly successful on all types of bulk feed. Still another objection and difficulty with pelletizing methods and equipment as heretofore employed have been that the moisture content or degree of freshness of the bulk feed being treated was critical. Still other problems result from the fact that previously attempted methods and equipment have been limited in output. Finally, another problem is that previously suggested methods and equipment have either been usable at a central location or in the field, but they have never been of such a character that they are adapted for use in either location.

The principal object of the present invention is the provision of an improved means for producing pellets of bulk animal food of the character generally identified by the term "hay."

Another object is the provision of means for pelletizing hay which avoids most or all of the objectionable features of methods and equipment of the prior art.

A further object of the present invention is the provision of a hay pelletizing machine which will produce a larger output at a lower unit cost than equipment known in the prior art.

A still further object of the present invention is the provision of an improved means for pelletizing hay which is versatile in its output, in the type of material which it will handle, and in the location in which it may be operated.

Other specific objects and features of the invention will be apparent from the following detailed description taken with the accompanying drawings; wherein FIG. 1 is a fragmentary plan view showing one embodiment of a hay pelletizing machine produced in accordance with the present invention;

Figure 1:
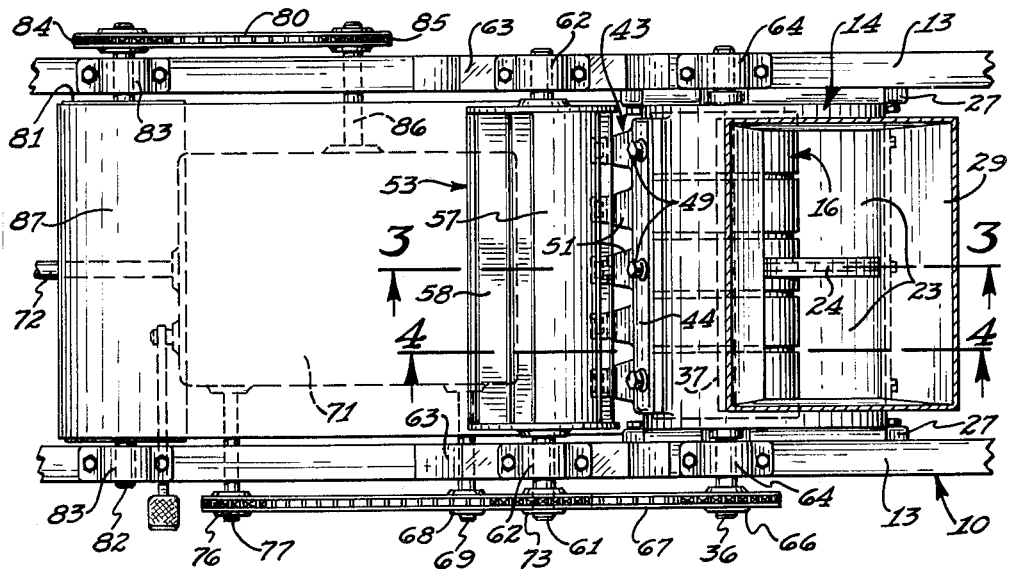
Figure 2:
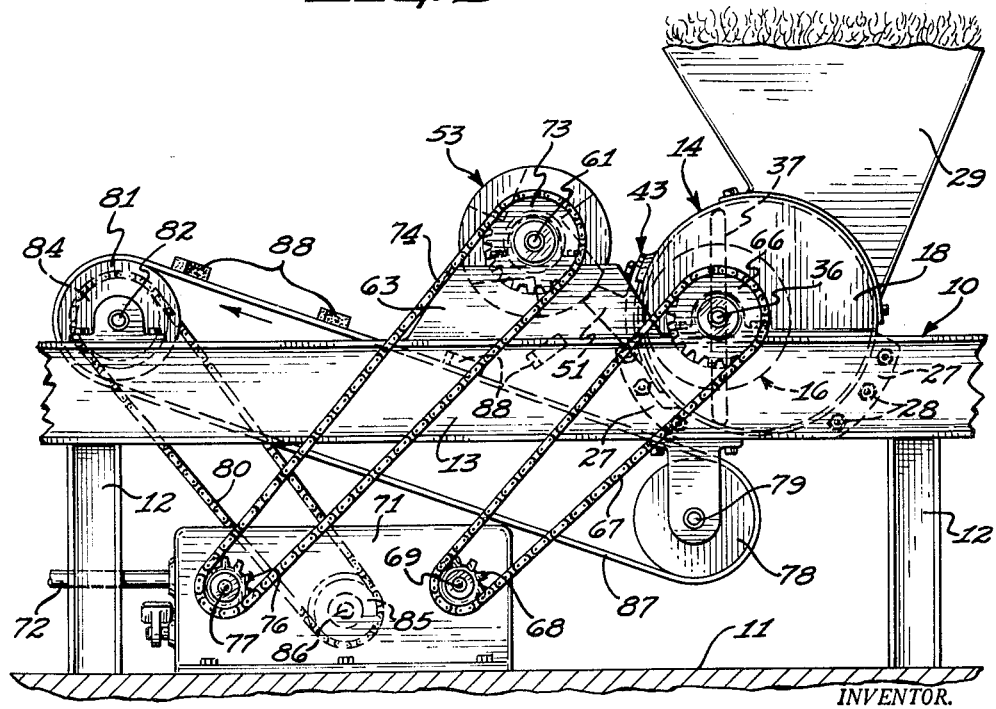
FIG. 2 is a fragmentary side elevational view of the figure shown in FIG. 1.

In accordance with the general features of the invention, the hay or other similar bulk cattle food is first comminuted by a chopping action to suitable condition for pelletizing, delivered to a confined space along which it is continuously moved, compacted first in one plane, then in a plane at right angles to the first plane, and finally in a plane at right angles to the first two mentioned planes to produce a compacted body of generally uniform cross-section. The compacted body so substantially continuously formed is excised in a series of cutting actions to produce pellets—form-retaining pellets of substantially uniform density and shape. Unlike methods of the prior art, there is no loose hay portion, as in the bottom of a cylinder, which will act to prevent uniform pelletizing action.

The method is preferably practised by means of the equipment in which the enclosed space is generally arcuate and convolute, and in which the hay is moved along the said convolute space and gradually compacted by means of a rotor and rotor blade and thence delivered to a series of dies where three-directional compaction occurs prior to each operation of cutting off the pre-conformed pellet.

Looking now to FIGS. 1 through 8 of the drawings, reference will be made first to the equipment with which the method is practised, it being obvious to those skilled in the art that the equipment may take various forms within the scope of the present invention. In the embodiment shown, a frame indicated generally by the reference character 10 includes a base 11, a plurality of uprights 12 and a pair of longitudinally extending channels 13 which form the main support for the functioning portion of the machine. The frame is suitably supported as on the floor or on wheels (not shown), depending upon the size of the machine and whether or not it is intended for use at a central location or for use in a field. Regardless of its location it may be part of a self-propelled unit or may comprise a trailer, and may be operated from any suitable source of power. My invention is not concerned with the location or manner of propulsion of the machine, except insofar as it may be understood that the particular manner of supporting or transporting the machine is not in any way limited because of its construction and the manner of its use. It should be noted also that all usually available farm equipment commonly employed in or around feed handling establishments may be employed.

The heart of the pelletizing portion of the machine is a shell indicated generally by the reference character 14, and a rotor assembly indicated generally by the reference character 16, the latter rotating within the former in a manner to be explained to accomplish the initial movement and the final pelletizing action on the comminuted hay.

The shell 14 includes a generally tubular side wall 17 and integral heads 18, each having an exterior boss 19 and an end opening 21 extending in each case entirely through the boss and heads 18. The shell also has a side opening 22 extending substantially its full length, and a pair of generally top openings 23 separated by a rib 24 which is integral with and forms a part of the tubular side wall 17.

Each head 18 has an end plate 26 secured thereto as by spot welding, and each of the end plates 26 has a pair of integral arcuate projections 27 which are secured to the contiguous channel members 13 of the frame 10 by means of bolts 28. The hopper 29 is secured over the openings 23 by means of bolts 31 so as to continuously feed suitably chopped hay or the like from the hopper to the interior of the shell 14 through the openings 23.

The rotor assembly 16 includes a rotor proper 32 having relatively thick side walls leaving a restricted longitudinal opening 33. Plugs 34 of hardened metal are suitably secured within the ends of the opening 33 and flush with the ends of the rotor, and the plugs 34 are apertured to receive stub shafts 36 suitably held in position to form a fulcrum on which the rotor may be rotated. Suitably the openings in the plugs 34 are splined to match an end spline on the stub shafts 36 so that when they are in position a firm engagement between the stub shaft and rotor is accomplished. The rotor also has a transverse slot running entirely through it, but spaced from its ends within which slot a solid rotor vane 37 is slidably supported. The rotor has a plurality of annular exterior slots 38, and the rotor vane has at opposite edges slots 39, the slots 38 and 39 being aligned to function in a manner as will be described hereinbelow.

The rotor is mounted within the shell member 14 and the manner of mounting is first to insert the rotor assembly 16 without its stub shafts within the shell member 14, and this may be accomplished after the latter is mounted on the frame 10. Holding the rotor assembly in alignment, the stub shafts are then inserted through the annular bosses 19 and secured as by driving action to the rotor assembly. It will be noted by reference particularly to FIGS. 3, 4 and 5 that the heads 18 of the shell member 14 are shouldered to provide space for the rotor 32 but such shoulder provides a clearance for the rotor vane 37 as shown in FIG. 5. Near such shoulder the shell 14 has a thickened segment on its inner periphery forming a generally tapered or convolute portion 41 against which the extreme outer edge of the rotor vane engages. There is also an intermediate convolute segment insert 42 in alignment with the rib 24 against which the rotor vane also engages. Between the members 41 and 42 at the lower portion of the shell member below the openings 23, such shell 14 is provided with a pair of pillow blocks 40. It will be observed that while the vane 37 has a transverse dimension generally equivalent to the diameter of shell 14, such shell is of the order of about 50% greater in internal diameter than the diameter of rotor 16 which carries the vane 37. The functioning of the surfaces comprising the pillow blocks 40 and the members 41 and 42 on which the rotor vane rides will be explained in connection with the descriptions of the machine's function.

Secured to the shell member 14 over the side opening 22 is a die block indicated generally by the reference character 43. The die block comprises a relatively heavy exterior plate 44 with a bottom portion 46 resting in a slot carried by a bracket 47, and an upper portion raised against a block 48 and held in position by bolts 49. As noted particularly in FIG. 6, the plate 44 is broken by a plurality of tapered dies 51 of rectangular cross-section which extend entirely through the plate 44 and are open at both their interior and exterior ends, the latter comprising the smaller end of the taper. As seen particularly in FIG. 6 also, the die block 43 fits snugly within the shell member 14 so that when it is mounted in position in the manner shown in FIGS. 3 and 4 a firm engagement takes place and the only opening through which the compacted hay may pass is that formed by the dies 51.

Figure 3:
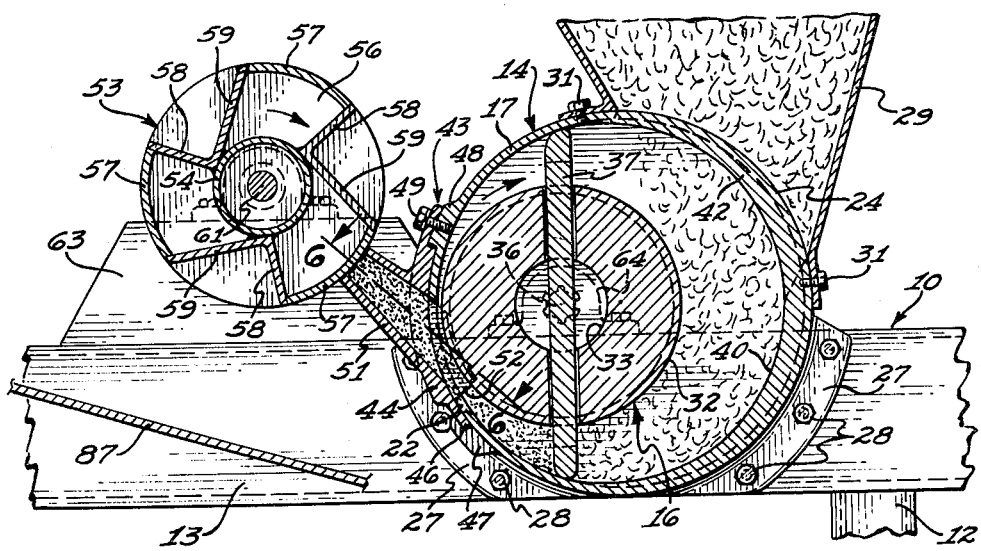
FIG. 3 is a fragmentary longitudinal sectional view taken along the lines 3—3 of FIG. 1 in the direction of the arrows.
Figure 4:
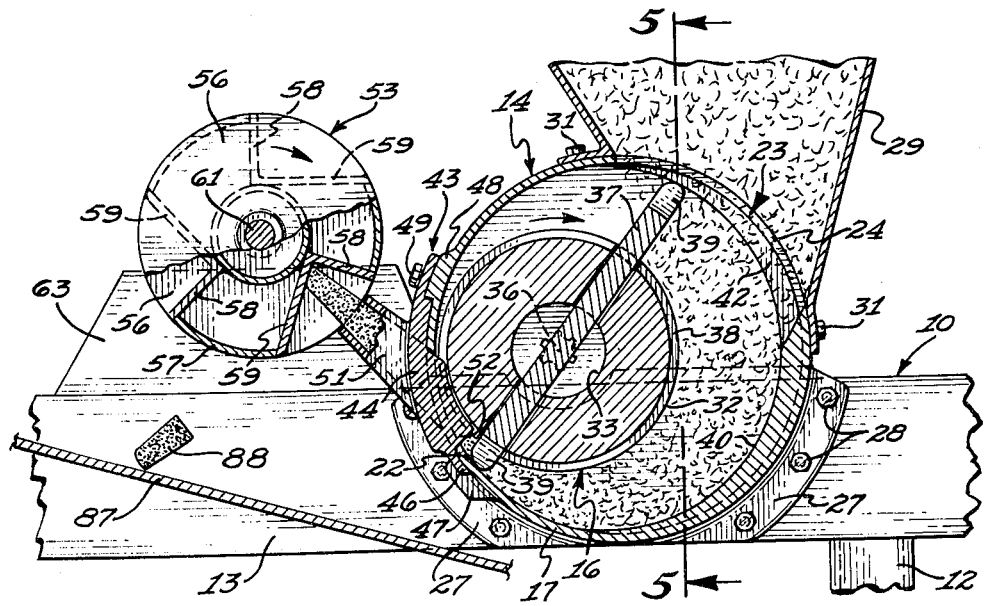
FIG. 4 is a longitudinal fragmentary sectional view taken on the line 4—4 of FIG. 1 looking in the direction of the arrows, part of FIG. 4 including an elevation taken in front of the section line in order to illustrate structure.
Figure 5:
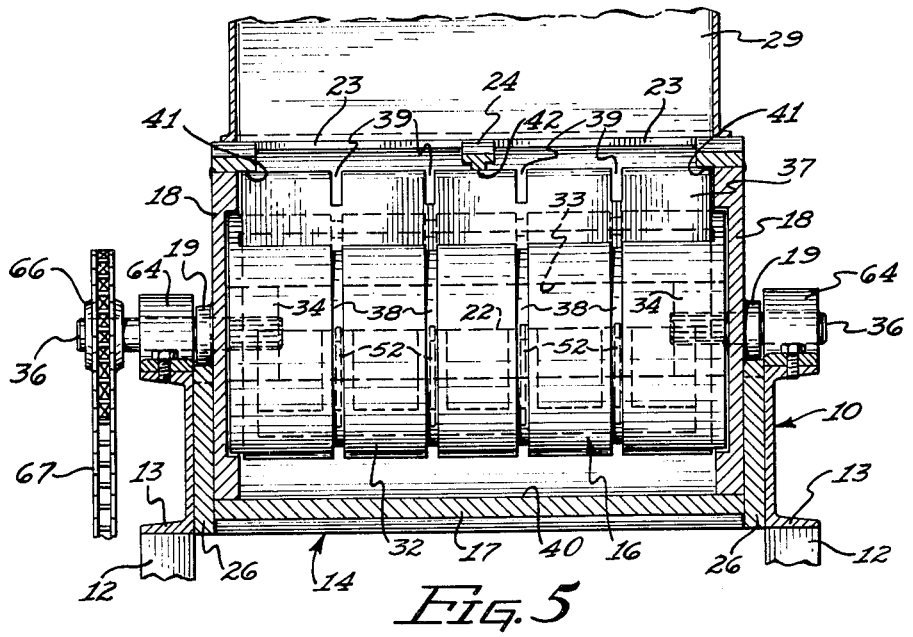
FIG. 5 is a transverse fragmentary vertical sectional view taken on the line 5—5 of FIG. 4 looking in the direction of the arrows.
Figure 6:
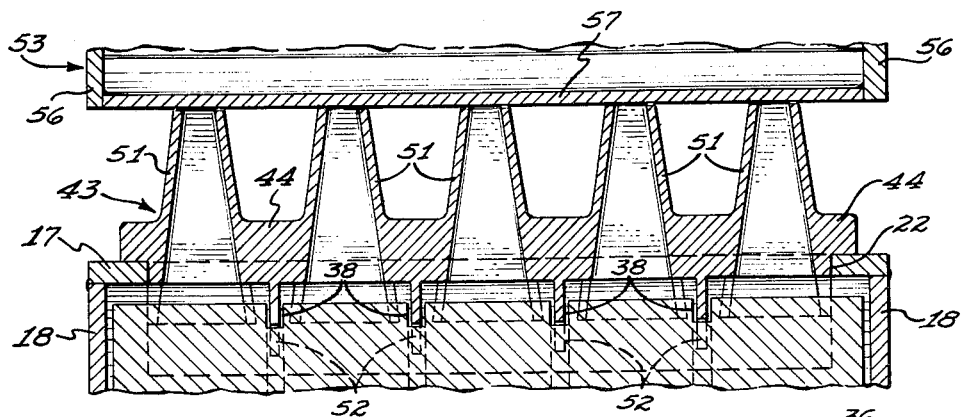
FIG. 6 is a fragmentary angular sectional view taken on the line 6—6 of FIG. 3 looking in the direction of the arrows.
Figures 7, 8:
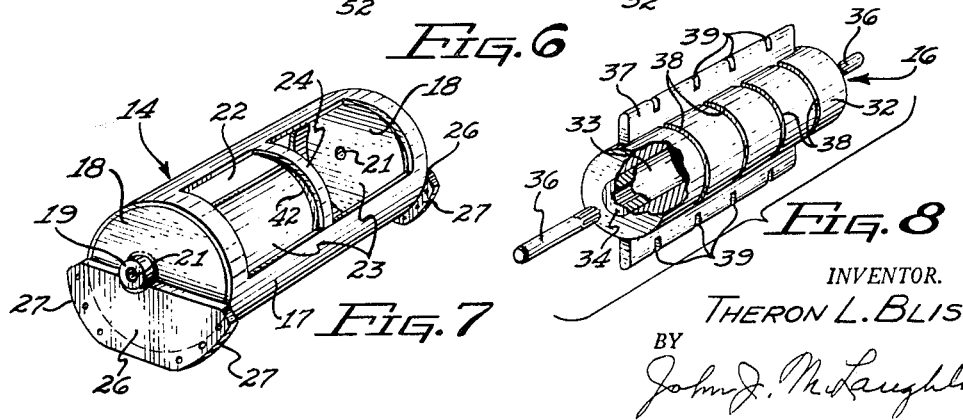
FIG. 7 is a perspective view of the shell which receives the hay from a hopper and within which it is compacted in the process of its being pelletized.
FIG. 8 is a partially exploded view showing the compacting rotor and rotor vane which function to accomplish the compacting action resulting in the pelletizing of the hay.

As noted particularly in FIGS. 3 and 4, each contiguous die forms a knife edge 52 which parts and cuts the compacted hay as it is delivered along its path to the dies 51. The knives 52 ride in the slots 38 and as the rotor vane passes the knives the knives enter the slots 39 and permit the rotor to move forwardly in a clockwise direction, as indicated by the arrows in FIGS. 3 and 4.

Immediately in front of the die block 43 is a cutter bar assembly indicated generally by the reference character 53 and comprising a tubular member 54, a pair of end plates 56, and as in the embodiment shown having a periphery formed of three arcuate plates 57 concentric with the tubular member 54, three generally radial plates 58 secured to both the tubular member 54 and the arcuate plates 57, and tangential plates 59 intercommunicating respectively with the contiguous arcuate plates 57 and radial plates 58. All of the plates 57, 58 and 59 extend the full width of the member 53 and are also secured to the end plates 56. The result is successive exteriors forming pressure plates coincident with the arcuate plates 57 forming compaction surfaces against which the pellets may be compressed, interspersed with discharge spaces for successive pellets, and shoulders having a cutting action for excising the pellets as they project from the dies.

The cutter bar assembly 53 is mounted on a shaft 61 which has its ends journalled in pillow blocks 62 carried on plates 63 projecting upwardly from the channels 13, and thereby forming a part of the frame.

The stub shafts 36 are journalled in external pillow blocks 64 carried by the frame 10, and a sprocket 66 is also carried by one of the stub shafts 36 and is rotated by a chain 67 also engaging a driving sprocket 68 on drive shaft 69 projecting from a suitable gear box 71 carried on the base 11. The gear box 71 is of any suitable type and receives its power from a drive shaft 72 leading to a source of power either permanently mounted or portable, depending upon the particular installation with which the mechanism is used. The source of power, of course, may be electrical, steam, gas engine, diesel or the like, or it may have its own source of power or be driven from a power take-off as desired.

The shaft 61 driving the cutter bar assembly 53 also carries a sprocket 73 driven by a chain 74 from a sprocket 76 mounted on a drive shaft 77.

The pelletizer of the present invention preferably employs a suitable conveyor system for loading or otherwise disposing of any pellets, although any suitable method or equipment for receiving and handling the pellets after they are formed may be used. In the drawings I show an idler drum 78 mounted on a suitable journalled shaft 79 and a driving drum 81 carried on a shaft 82 journalled in pillow blocks 83. The shaft 82 also carries a sprocket 84 driven by a chain 80 from a driving sprocket 85 mounted on a driving shaft 86. A belt 87 carried on the drums 78 and 81 receives the pellets 88 as they are formed, and carries them upwardly for delivery as they are required. It should be understood as noted previously that the conveyor is illustrative and may be of any suitable type to accomplish the desired result. Suitably also it may lead to a cross conveyor (not shown) which is part of a loading mechanism not forming part of the present invention.

Those skilled in the art will understand that the speed of the drive shaft 72 and the particular arrangement of gears within the gearbox 71 may be selected in accordance with standard engineering practice, and that also the relative speeds of the several driving parts may be in part controlled through the control of sizes of the various sprockets employed. The chain and sprocket drive also is illustrative of a suitable form of drive, it being understood that any usual and functional type of drive mechanism accomplishing the proper relative speeds of the parts between the power source and the driven part may be used.

While in general the operation of the machine of the present invention will be clear from the previous description, there are several features concerned with its operation which may be pointed out in order that those skilled in the art may have a better understanding of the manner in which the invention is practised. As already pointed out, the hay is passed through a suitable chopper, of which many are known in the art, and delivered continuously to the hopper 29 as the pelletizer continues its operation. I have pointed out also that while the moisture content and degree of freshness (how recently cut and in what condition of growth) of the hay or other haylike material may vary, I wish to point out also that many of these matters have been given considerable study and are generally well known in the art. I wish to point out, however, that there is considerably wider latitude in the best pelletizing conditions when using the method and equipment of the present invention as contrasted with methods and equipment in which, for example, pelletizing is accomplished by direct action of a piston or ram within a cylinder.

Assuming a full hopper, the chopped hay continues to move downwardly into the arcuate and ellipsoidal space between the interior of the shell member 14 and the exterior of the rotor 16, as noted particularly in FIGS. 3 and 4. Looking first at FIG. 3 it will be noted that the bottom edge of the rotor vane is forcing compacted material between the narrowing space between the rotor and shell while at the same time the upper part of the vane moving in the direction shown by the arrow is starting to pick up the hay at the right or bigger volume portion of the space and compact it in turn. Looking also to the dies 51 it will be noted that while they are of rectangular cross-section they become narrower in two directions as they extend outwardly, thus now compacting the hay in a direction at right angles to the direction in which it had been compacted originally. It should be noted also that the arcuate plate 57 is in a position to close the outer end of the dies, so that by forcing the material against this arcuate plate the hay is also compacted longitudinally of the dies or at right angles to the two planes in which it had previously been compacted.

Looking now to FIG. 4 where the rotor vane has advanced to a further position, the cutter bar assembly has also advanced to a further position and the pellet has been ejected to the point where it is about to be cut off by the generally radial plate 58. To understand the action it must be remembered that the cutter bar assembly moves and rotates at a higher rate of speed than the rotor assembly, the exact speed depending upon the number of cutting edges and the capacity of the compacter. It should be noted that as the hay is moved forward into the dies 51 it is parted and separated with a cutting action by the knives 52, and the rotor vane will clear the knives because of the slots 39. The pellets are ejected at a relatively rapid rate, it being obvious that the capacity of the machine may be controlled by controlling its width and the number of dies 51, as well as by the speed at which it is rotated. In general, however, it is not advisable to vary the speed of operation too greatly because, generally speaking, with a given set of dimensions there is a relatively narrow range of speed which yields the best operating conditions and conservation of power.

Generally speaking, it is preferable that the hay fed to the machine be slightly wilted, but it is not necessary that any heat or any drying be employed. Suitably the pellets are about two inches by one inch by about one-and-a-half inches, although considerable variation from these specific dimensions may be made if desired. There is normally enough heat developed in the compression to prevent spoilage, and the pellets have a composition generally similar to plug tobacco because they are compressed moist or semi-moist and they need no binder. The nutritional value of the hay pelletized by means of the present invention in general is greater than in other pelletizing methods and machines in which special treatment such as by drying and the use of binders is required.

Those skilled in the art will understand from the above specific description that the machine of the present invention may be modified in many ways while still obtaining substantially the same properties in the finished pellets. In accordance with one modification of the invention the arcuate plates 57 may be omitted so that compaction against them will not occur. In such a case, pressure against the hay and resulting compaction thereof will occur primarily in the two right angular planes defined by the generally flat sides of the die 51. I have found that the only particular objection is that the ends of the pellets are not quite so compact and self-sustaining as they are when the longitudinal compaction is obtained. In this connection it should also at once be apparent that the relative speed at which the cutter bar assembly is rotated, as well as the number of cutting edges, determines the length of the pellets. If desired for any reason the machine may be constructed to merely deliver a compacted rope of hay or the like, and means other than the cutter bar assembly utilized to break it up into uniform size or random size individual pellets.

Figure 9:
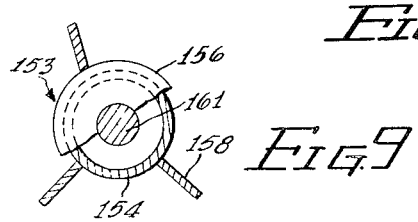
FIG. 9 is a fragmentary view showing a modification of the cutter bar assembly.

FIG. 9 is a fragmentary view showing the cutter bar assembly in modified form as indicated by the reference character 153. This construction corresponds generally with the cutter bar 53 as shown at the left hand side of FIGS. 3 and 4. But instead of having arcuate plates against which the pellets project, these plates are omitted and the end plates 156 are of smaller diameter, being only slightly larger than the tubular member 154. The shaft 161 is driven as in the embodiment shown in FIGS. 1–8, and, of course, end plates 156 may be attached directly to the shaft in any suitable manner as by welding. The principal difference, other than the elimination of arcuate plates 57, is the provision of a plurality of radial plates 158 secured as by welding directly to the tubular member 154. There is no equivalent of the tangential plates 59 which extend between the radial plates 58 and the arcuate plates 57 so that the radial plates 158 are secured directly and firmly as by means of a line of weld to tubular member 154. With this construction the hay receives only such compaction as occurs by reason of its passing through the generally crescent shaped area shown in FIGS. 3 and 4.

The machine, of course, may only have a single die with only a relatively narrow rotor, or the number of dies may be controlled to suit a desired capacity. The particular arrangement of separating knives between the dies is very effective, but other related separating means to split the hay into a number of streams corresponding to the dies may be utilized.

It should be noted that the opening in the shell member through which the hay is delivered to the generally crescent shaped space is positioned so that little or no hay will be delivered to the left side of the upper facing edge of the vane until this member is approximately in the position shown in FIG. 4, so that very little if any of the hay will at any time drop into the relatively narrow space where the arrow is located in FIG. 3. The hay ahead of the vane 37 at top of the crescent-shaped space and below the hopper is carried in a clockwise direction by the vane 37 which at this time has its bearing against the members 41 and 42 and is thus positioned at its bottom edge as shown in FIGS. 3 and 4 to continue to compact the hay forwardly of the bottom edge of the vane as the bag is delivered to the tapered dies 51. As the top edge of the vane then passes the openings 23 (FIG. 7), the vane engages the pillow blocks 40, continues to hold the vane in operative position, and seals the hay for final compaction below the openings 23. At this time additional hay is delivered from the hopper and provides feed for compaction by the bottom edge of the vane 37 (looking at FIGS. 3 and 4) which is now rising to an upper position as it passes the dies 51. Thus by means of the single rotor vane I am able to avoid the necessity of spring biased vane members, since at all locations around the periphery the vane has its two opposite side edges positioned by riding around on suitably spaced interior surfaces. In compacting the hay, therefore, the vane always moves along a path so as to carry the hay along the desired closed path of the crescent defining a continuously narrowing space. For this reason, the crescent shaped space formed by the shell member and rotor member respectively is enabled to receive such a volume of hay that when it is finally compacted into the dies it will have the proper amount of compaction. Illustratively, if this space were very much narrower the hay would be moved around and into the dies, but would not be sufficiently compacted for my purpose. For this reason, by controlling the volume into which the loose hay is first fed with respect to the dies, the number of vane surfaces performing the compacting function might be changed to one, three, four or any number desired within the limits of a structural design.

As pointed out, however, I prefer to employ the single vane extending entirely through the rotor, because by this means I avoid the use of springs or other biasing mechanism and produce a machine which is substantially free of failures, except insofar as normal wear and tear are concerned.

I have shown and described the invention in considerable detail so that those skilled in the art may understand the manner of practising the same, but the scope of the invention is limited only by the claims.

I claim:

1. In a hay pelletizing machine, a generally tubular shell member, a rotor assembly rotatably supported within said shell member with its axis offset from but parallel to the shell member axis, a rotor vane slidably supported within a radially disposed slot extending entirely through said rotor, said vane dimensioned to ride along an inside surface of the shell member, the said rotor and shell member together defining a tapered crescent shaped space, at least one die member secured in an aperture in the shell at a minimum cross-sectional area location with respect to said crescent shaped space, said aperture extending through the shell and being positioned at an apical portion of said crescent shaped space, said die member including at least one tapered die in which the smaller cross-sectional portion faces outwardly, means for introducing hay or the like for compaction, and means for driving said rotor to cause the said rotor vane to move said hay along said tapered crescent shaped space, and through the said die to form compacted hay pellets.

2. A hay pelletizing machine as defined in claim 1, including a plurality of dies, and a parting knife between the dies for directing the partially compacted hay in the form of separated streams, one for each die.

3. A hay pelletizing machine as defined in claim 1, including a plurality of dies, and a parting knife between the dies for directing the partially compacted hay in the form of separated streams, one for each die, and in which said rotor and rotor vane are slotted to clear the knives and permit close engagement between the rotor assembly and the openings to said dies.

4. A hay pelletizing machine as defined in claim 1, including a plurality of narrow tapered and generally crescent shaped ridges within the shell member on which the said rotor vane rides to bias the said rotor vane at its opposite edge to bias said edge toward said die.

5. A hay pelletizing machine as defined in claim 1, wherein said means for introducing hay or the like includes a hopper secured to the said shell member, said shell member having an opening substantially coextensive with a bottom opening in the hopper, whereby cut hay or the like introduced into the hopper is fed continuously into said crescent shaped space.

6. In a hay pelletizing machine, a generally tubular shell member, a rotor assembly rotatably supported within said shell member with its axis offset from but parallel to the shell member axis, a rotor vane slidably supported within a radially disposed slot extending entirely through said rotor, said vane dimensioned to ride along an inside surface of the shell member, the said rotor and shell member together defining a tapered crescent shaped space, at least one die member secured in an aperture in the shell at a minimum cross-sectional area location with respect to said crescent shaped space, said aperture extending through the shell and being positioned at an apical portion of said crescent shaped space, said die member including at least one tapered die in which the smaller cross-sectional portion faces outwardly, means for introducing hay or the like for compaction, and means for cutting the compacted hay at the smaller cross sectional portion of said die to produce uniformly compacted pellets of substantially uniform size and shape.

7. In a hay pelletizing machine, a generally tubular shell member, a rotor assembly rotatably supported within said shell member with its axis offset from but parallel to the shell member axis, a rotor vane slidably supported within a radially disposed slot extending entirely through said rotor, said vane dimensioned to ride along an inside surface of the shell member, the said rotor and shell member together defining a tapered crescent shaped space, at least one die member secured in an aperture in the shell at a minimum cross-sectional area location with respect to said crescent shaped space, said aperture extending through the shell and being positioned at an apical portion of said crescent shaped space, said die member including at least one tapered die in which the smaller cross-sectional portion faces outwardly, means for introducing hay or the like for compaction, and means for periodically closing said die to cause longitudinal compaction of the hay to form pellets.

8. In a hay pelletizing machine, a generally tubular shell member, a rotor assembly rotatably supported within said shell member with its axis offset from but parallel to the shell member axis, a rotor vane slidably supported within a radially disposed slot extending entirely through said rotor, said vane dimensioned to ride along an inside surface of the shell member, the said rotor and shell member together defining a tapered crescent shaped space, at least one die member secured in an aperture in the shell at a minimum cross-sectional area location with respect to said crescent shaped space, said aperture extending through the shell and being positioned at an apical portion of said crescent shaped space, said die member including at least one tapered die in which the smaller cross-sectional portion faces outwardly, means for introducing hay or the like for compaction, and means for alternately closing said die to cause longitudinal compaction of the hay and cutting the compacted hay into pellets of substantially standard size and shape after the so compacted hay has been moved through the die.

9. In a hay pelletizing machine, a shell member having a side opening and at least one opening near a top portion thereof, a rotor member within the shell member having its axis displaced from but parallel with the axis of the shell member, said shell member and rotor member thereby defining a crescent shaped space between them, hopper means carried by the shell member over said top opening to continuously feed chopped hay or the like to said crescent shaped space, at least one rotor vane carried by the rotor member having an outside edge biased toward the inside surface of the shell member so that when the rotor member is rotated within the shell said rotor vane will advance the said hay or the like along said crescent shaped space and towards said side opening in the shell member at a position where the said crescent shaped space occupies its smallest dimension, and at least one tapered die supported in said side opening to further compact the hay or the like as it is forced through the die by movement of said rotor vane.

10. A hay pelletizing machine as defined in claim 9, wherein said rotor vane comprises a single plate slidably extending entirely through the axis of the rotor to define a pair of vane members 180° apart.

11. A hay pelletizing machine as defined in claim 9, wherein said rotor vane comprises a single plate slidably extending entirely through the axis of the rotor to define a pair of vane members 180° apart, and wherein said shell member has a diameter approximately fifty percent greater than that of the rotor leaving a crescent shaped space whose maximum cross-section is approximately equal to the radius of the rotor.

12. A hay pelletizing machine as defined in claim 9, including a plurality of dies aligned with said side opening in the shell member, and a parting knife between adjoining dies.

13. In a hay pelletizing machine, a shell member having a side opening and at least one opening near a top portion thereof, a rotor member within the shell member having its axis displaced from but parallel with the axis of the shell member, said shell member and rotor member thereby defining a crescent shaped space between them, hopper means carried by the shell member over said top opening to continuously feed chopped hay or the like to said crescent shaped space, at least one rotor vane carried by the rotor member having an outside edge biased toward the inside surface of the shell member so that when the rotor member is rotated within the shell said rotor vane will advance the said hay or the like along said crescent shaped space and towards said side opening in the shell member at a position where the said crescent shaped space occupies its smallest dimension, and means for compacting said hay longitudinally of its direction of movement by said vane.

14. In a hay pelletizing machine, a shell member having a side opening and at least one opening near a top portion thereof, a rotor member within the shell member having its axis displaced from but parallel with the axis of the shell member, said shell member and rotor member thereby defining a crescent shaped space between them, hopper means carried by the shell member over said top opening to continuously feed chopped hay or the like to said crescent shaped space, at least one rotor vane carried by the rotor member having an outside edge biased toward the inside surface of the shell member so that when the rotor member is rotated within the shell said rotor vane will advance the said hay or the like along said crescent shaped space and towards said side opening in the shell member at a position where the said crescent shaped space occupies its smallest dimension to compact said hay, and means for forming the compacted hay into uniform size substantially rectangular pellets.

15. In a hay pelletizing machine, a shell member having a side opening and at least one opening near a top portion thereof, a rotor member within the shell member having its axis displaced from but parallel with the axis of the shell member, said shell member and rotor member thereby defining a crescent shaped space between them, hopper means carried by the shell member over said top opening to continuously feed chopped hay or the like to said crescent shaped space, at least one rotor vane carried by the rotor member having an outside edge biased toward the inside surface of the shell member so that when the rotor member is rotated within the shell said rotor vane will advance the said hay or the like along said crescent shaped space and towards said side opening in the shell member at a position where the said crescent shaped space occupies its smallest dimension, means for compacting the hay longitudinally of its direction of movement by said vane, and means for cutting the compacted hay to produce uniform size pellets.

References Cited in the file of this patent
UNITED STATES PATENTS

| | | |
|---|---|---|
| Re. 13,042 | Goldschmidt | Nov. 16, 1909 |
| 649,413 | Luzzatto | May 8, 1900 |
| 2,923,230 | Bornzin | Feb. 2, 1960 |
| 2,947,241 | Guenther | Aug. 2, 1960 |
| 3,006,272 | Brady | Oct. 31, 1961 |
| 3,009,413 | Alexander et al. | Nov. 21, 1961 |